United States Patent [19]
Garito et al.

[11] Patent Number: 5,180,308
[45] Date of Patent: Jan. 19, 1993

[54] MEDICAL DEMONSTRATION MODEL

[76] Inventors: Jon C. Garito, 264 Hedge La., Hewlett Harbor, N.Y. 11577; Alan G. Ellman, 1 Auerbach La., Lawrence, N.Y. 11516

[21] Appl. No.: 817,045

[22] Filed: Jan. 6, 1992

[51] Int. Cl.$^5$ .............................................. G09B 23/28
[52] U.S. Cl. ...................................... 434/262; 454/56; 248/300; 434/263
[58] Field of Search .................. 434/262, 263; 433/49; 454/56, 63; 98/115.3, 115.4; 248/174, 300, 309.1

[56] References Cited

U.S. PATENT DOCUMENTS

| | | | |
|---|---|---|---|
| 2,397,731 | 4/1946 | Fowler | 454/56 X |
| 4,073,460 | 2/1978 | Dale | 248/174 X |
| 4,213,755 | 7/1980 | Zweben | 433/49 |
| 4,458,674 | 7/1984 | Lemburg et al. | 600/22 |
| 4,936,824 | 6/1990 | Koch et al. | 600/22 |
| 4,947,510 | 8/1990 | English | 454/56 X |
| 5,009,379 | 4/1991 | Sadler | 248/174 |

FOREIGN PATENT DOCUMENTS

| | | | |
|---|---|---|---|
| 392775 | 10/1965 | Switzerland | 434/263 |
| 1364331 | 1/1988 | U.S.S.R. | 433/49 |
| 9011844 | 8/1990 | World Int. Prop. O. | 454/56 |

*Primary Examiner*—John J. Wilson
*Assistant Examiner*—L. Thomas

[57] ABSTRACT

A novel stand for demonstrating electrosurgical, laser, and electrocautery treatments with animal tissue. The stand can have a simple C-shape, and be connected via a tube to a conventional vacuum device. Any smoke or noxious vapors generated during the simulated treatment are efficiently and effectively removed by the vacuum device.

8 Claims, 3 Drawing Sheets

MEDICAL DEMONSTRATION MODEL

This invention relates to a demonstration model for various medical, dental, or veterinary procedures, and in particular to such a model for demonstrating electrosurgical procedures.

BACKGROUND OF THE INVENTION

Electrocautery, radiosurgery, electrosurgery, and laser use in the dental, medical and veterinary fields have become widely used and accepted techniques. Demonstration of these devices is frequently done in exhibition centers, hotel conference rooms, private offices, clinics, university lecture rooms and classrooms around the world. In order to simulate actual clinical use, several types of specimens are used, such as chicken, beefsteak,, tongue, etc. When the specimens are burnt during these procedures, a smoke plume results which has an unpleasant smell and a cloud which visually compromises the demonstration or practice procedure. Moreover, the odor from the animal tissue is unpleasant and potentially hazardous to health care professionals who are exposed to it. Additionally, in exhibition halls where others are present, it is also unplesant.

SUMMARY OF THE INVENTION

An object of the invention is a demonstration model which can remove smoke and odors generated during a demonstration or practice of a procedure involving burning of animal tissue without interfering with visual observation by one or more persons of the demonstration.

In accordance with one aspect of the invention, a novel stand is provided for supporting a specimen that will be subject to one of the aforesaid types of procedures. The stand is shaped so as to receive and support means for evacuating any smoke or other noxious vapors generated during the demonstration. Preferably, the evacuation means comprises a tube that can be readily connected to a conventional suction or vacuum device.

Preferably, the stand has a general C-shape, with the evacuation tube mounted at an upper portion of the stand.

In accordance with a further aspect of the invention, the stand top is configured for receiving and supporting the instrument or machine to be used in the procedure, which makes for a very compact system readily hand-carried from place to place.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described the preferred embodiments of the invention.

DETAILED DESCRIPTION OF THE PREFERRED EMBODIMENTS

Figure 1:
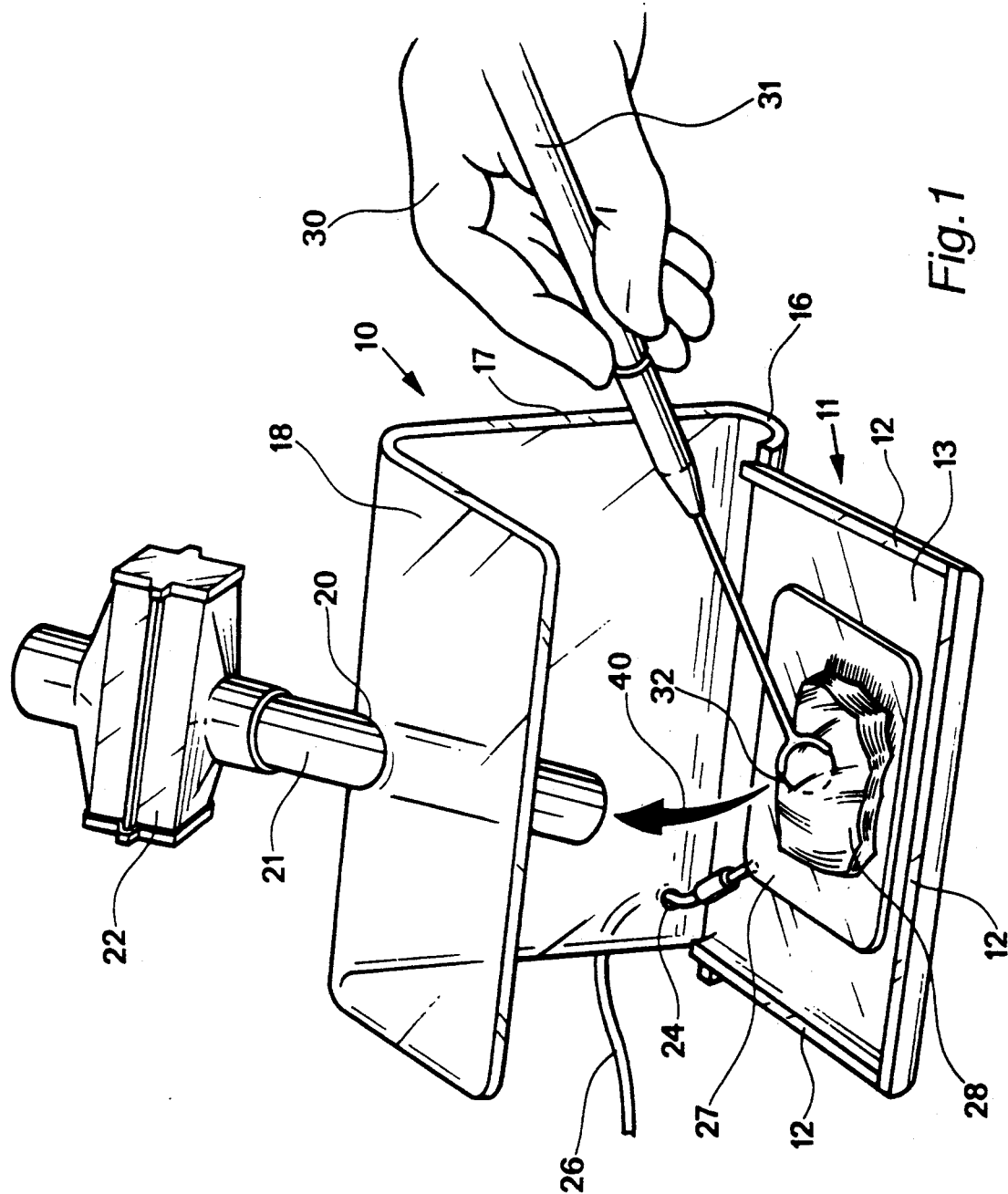
FIG. 1 is perspective view of one form of stand in accordance with the invention shown as it would be used during a demonstration.

One form of the demonstration stand 10 according to the invention is illustrated in FIG. 1 as it would be used in, for example, an electrosurgical procedure. The stand 10 comprises a platform or bottom portion 11 which has raised edges 12 enclosing a specimen receiving area 13. The rear of the platform is curved down 16 and then projects upward to form a back side portion 17, which in turn supports a top or hood portion 18. The front, and left and right sides are open, and viewed from the side the stand 10 forms a generally C-shaped structure. The stand is preferably formed in one-piece by bending from a transparent sheet of plastic, such as Lucite, but metal can also be used.

A hole 20 is provided in an upper part of the structure for receiving a conventional suction tube 21 connected by way of a conventional viral filter 22 to a conventional evacuating, vacuum, or suction device (not shown). Another smaller hole 24 is provided at the bottom portion through which a cable 26 for an electrosurgical patient plate electrode 27 can pass. The latter seats on receiving area 13, and on the patient plate 27 is seated a tissue specimen 28.

In operation, after the specimen 28 has been placed inside the stand 10, the electrosurgical or other instrument is activated, as is the suction device, creating a suction force within the stand 10. FIG. 1 shows the hand 30 of a physician holding the handpiece 31 of the instrument to which is attached a loop electrode 32. The activated loop will cut or burn the tissue specimen, during which procedure smoke and vapors are generated. The vacuum device creates enough of a suction force to efficiently and effectively remove all potentially airborne particles of hazardous smoke and noxious odors that is typically associated with demonstrations of electrocautery, radiosurgery, electrosurgery, and lasers involving animal tissue burning. This is shown by the arrow 40 in FIG. 1. The suction tube 20 can be adjusted in position closer or further from the specimen depending upon the degree of smoke generation.

Figure 2:
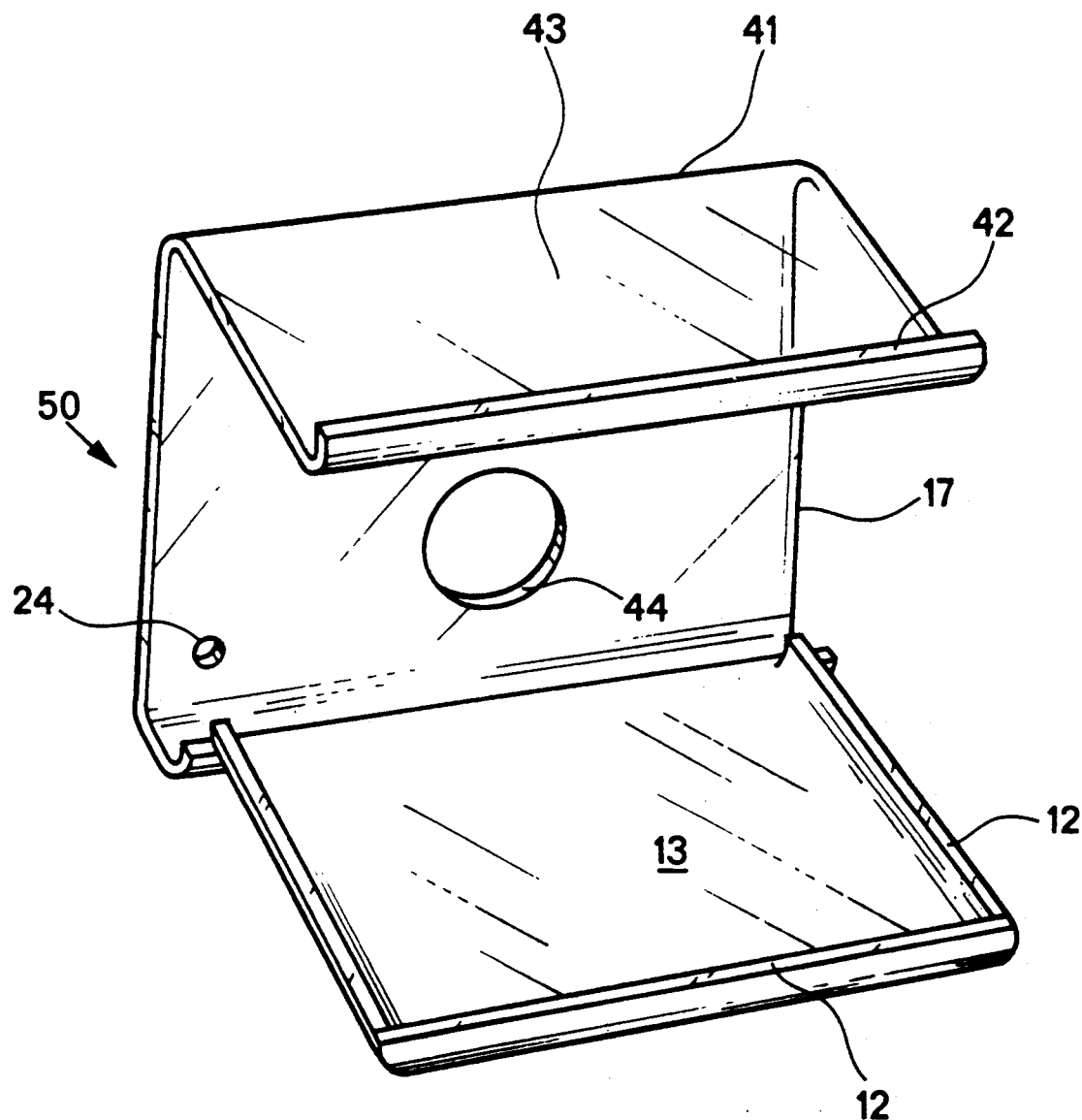
FIG. 2 is a perspective view of a modified stand in accordance with the invention.

In the FIG. 1 embodiment, the top 18 is flat. In the modification illustrated in FIGS. 2 and 3, the top portion 41 slopes slightly downward, and has a raised edge 42 in front. This forms a recessed or depressed area 43 for receiving the instrument to be used in the demonstration procedure. The only other change is the location of the hole 44 for receiving the suction tube, which has been moved down to the center of the back wall 17. Otherwise, the structure is the same as in FIG. 1, and the same reference numerals have been used for corresponding parts.

Figure 3:
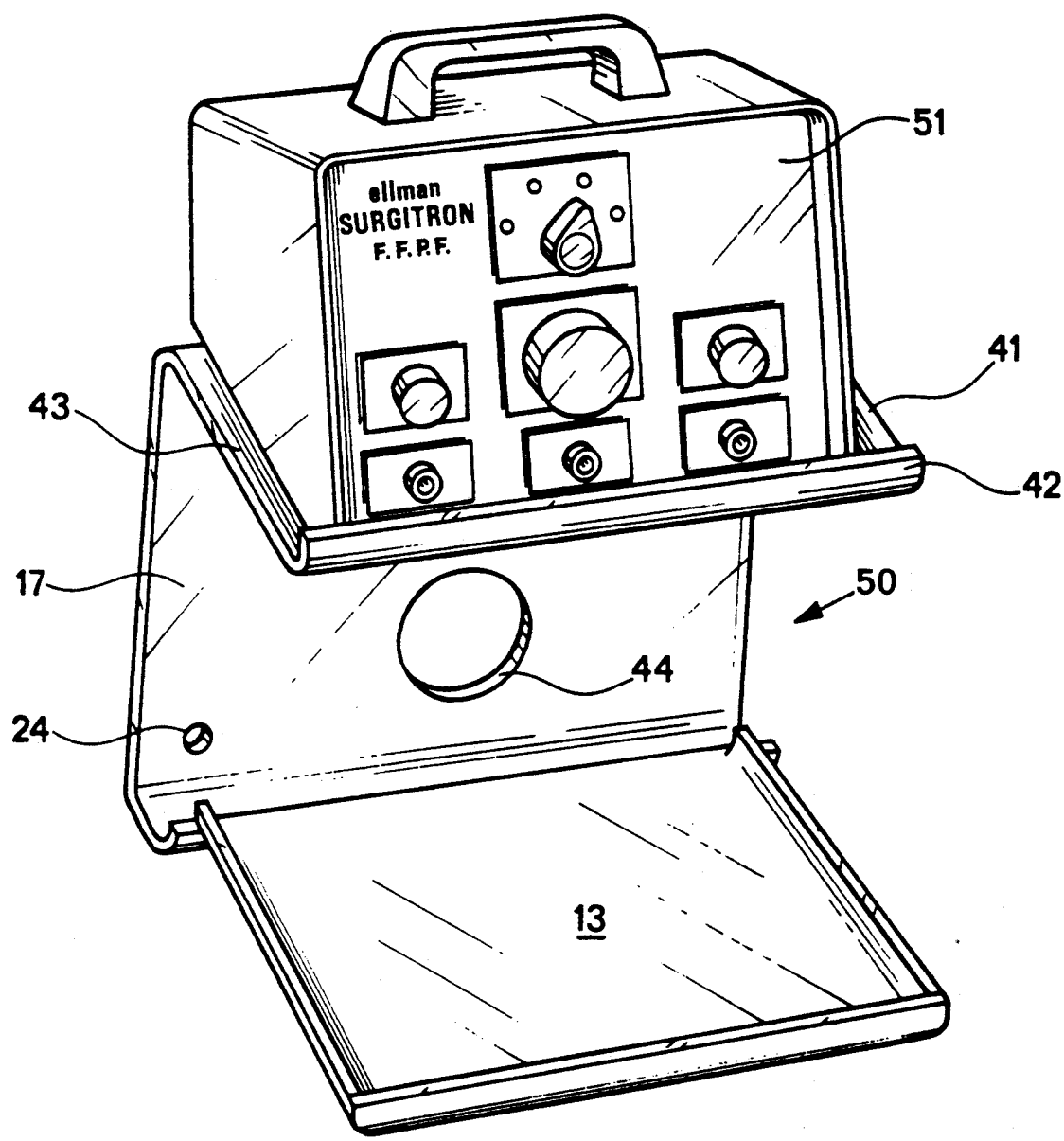
FIG. 3 shows how the modified stand would be used.

FIG. 3 shows a conventional electrosurgical machine 51, in this instance the Ellman SURGITRON F.F.P.F., seated in the depression area 43 formed at the top. The stand walls are of sufficient strength to easily support such an instrument.

The result is a highly compact structure, inexpensively made and yet efficiently carrying out the necessary task of removing any smoke or vapor generated during the demonstration. Moreover, the demonstration is easily viewed from all sides by one or more persons, especially when the stand is constructed of transparent material. It is thus clear that, though simple, the demonstration stand of the invention provides a very useful and important advance in the art.

While the invention has been described in connection with preferred embodiments, it will be understood that modifications thereof within the principles outlined above will be evident to those skilled in the art and thus the invention is not limited to the preferred embodiments but is intended to encompass such modifications.

What is claimed is:

1. A demonstration model for medical, dental or veterinary procedures involving a burning treatment or the like of an animal tissue specimen likely to generate smoke or noxious vapors comprising:
   a generally C-shaped structure having a bottom portion sized to accommodate the specimen, a top portion, and a single side portion solely supporting the top portion on and extending above and over the bottom portion,
   means for connecting to the C-shaped structure suction-generating means for providing within the structure over the bottom portion a suction force sufficient to remove any smoke or noxious vapors generated during the treatment, said connecting means comprising a hole in an upper part of the structure to receive a tube connected to the suction-generating means,
   the front of the C-shaped structure being open to allow access to a specimen on the bottom portion by a burning instrument manipulated by a person demonstrating the procedure.

2. The demonstration model of claim 1, wherein the structure is of a transparent material.

3. The demonstration model of claim 2, wherein the structure is one-piece.

4. The demonstration model of claim 1, wherein the top portion is configured to receive and support a machine to be used in the treatment.

5. The demonstration model of claim 4, wherein the hole is in an upper part of the side portion and the machine is an electrosurgical instrument.

6. The demonstration model of claim 5, wherein the top portion comprises a central depressed area to receive the machine.

7. The demonstration model of claim 4, in combination with an electrosurgical machine seated in the depressed area and a suction tube connected to the suction-generating means mounted in an upper part of a side portion of the structure.

8. The demonstration model of claim 1, in combination with a suction tube connected to the suction-generating means mounted in an upper part of the structure.

* * * * *